2,185,634

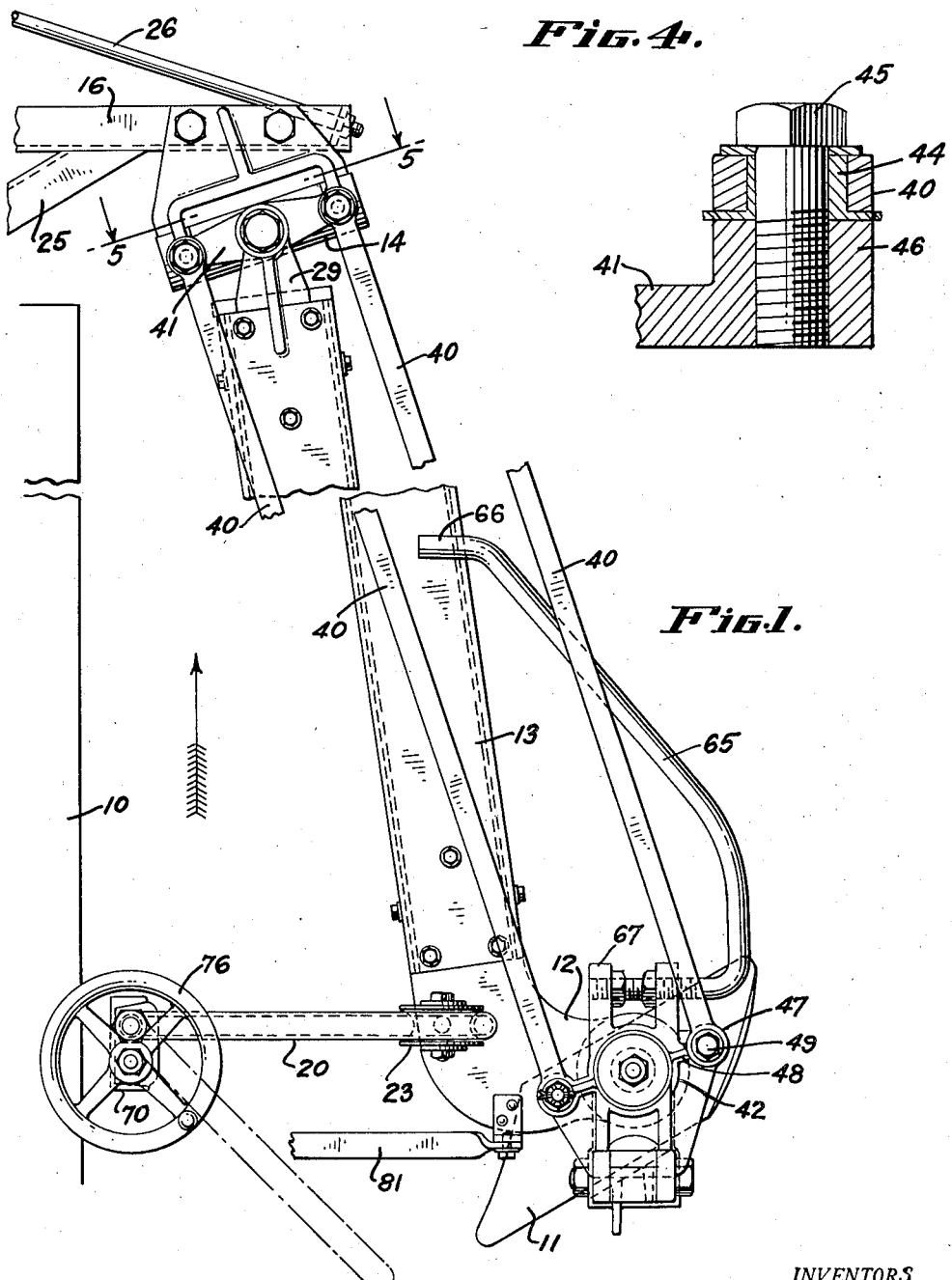
Jan. 2, 1940. H. A. JACOBS ET AL 2,185,634
CULTIVATOR FOR VINEYARDS
Filed March 31, 1939 2 Sheets-Sheet 1
INVENTORS
HENRY A. JACOBS
HUBERT M. ARMISTEAD
BY Jas. M. Naylor
ATTORNEY Jan. 2, 1940.                H. A. JACOBS ET AL                 2,185,634
                              CULTIVATOR FOR VINEYARDS
                              Filed March 31, 1939        2 Sheets-Sheet 2
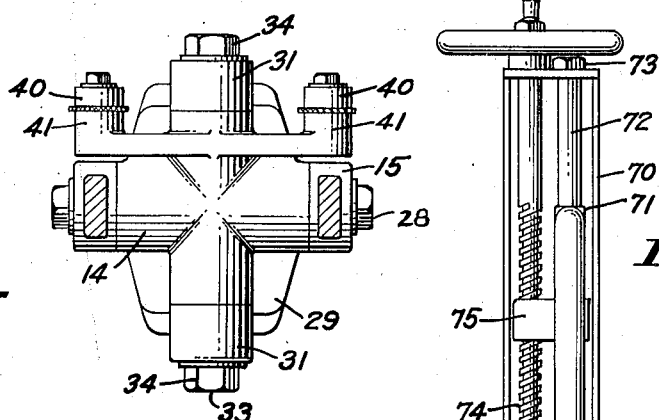
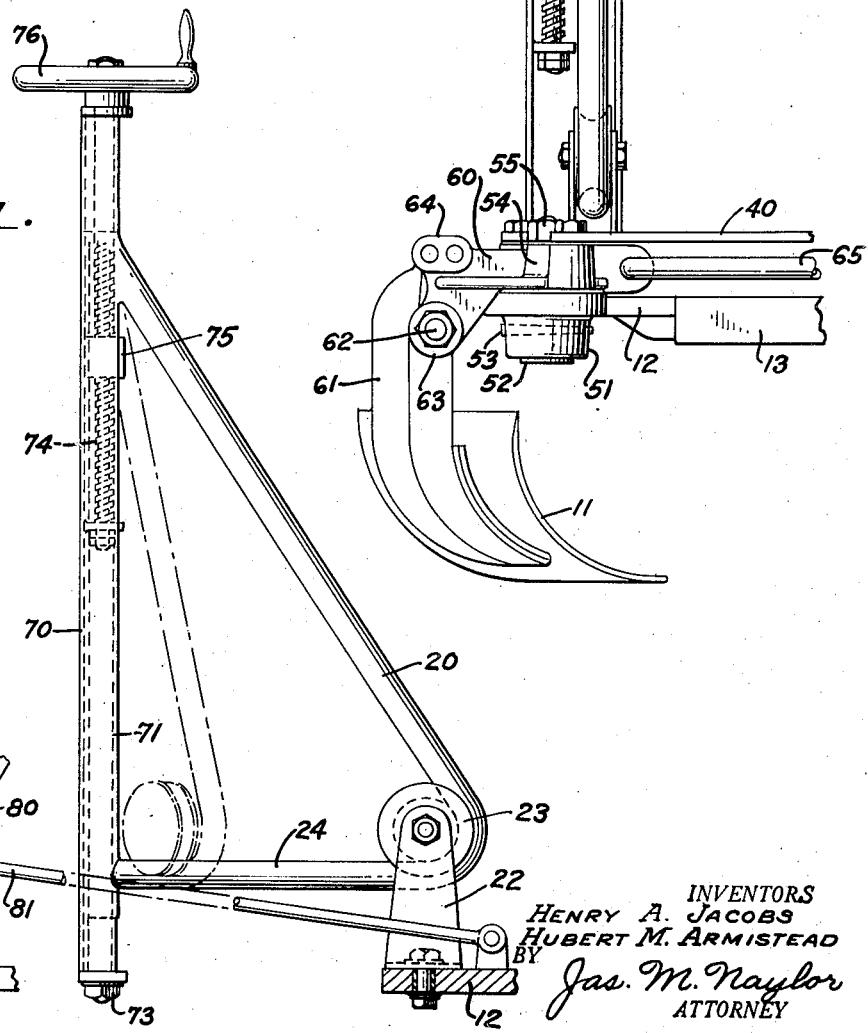
INVENTORS
HENRY A. JACOBS
HUBERT M. ARMISTEAD
BY
Jas. M. Naylor
ATTORNEY Patented Jan. 2, 1940

UNITED STATES PATENT OFFICE 2,185,634

CULTIVATOR FOR VINEYARDS

Henry A. Jacobs and Hubert M. Armistead, San Francisco, Calif.; said Armistead assignor to said Jacobs Application March 31, 1939, Serial No. 265,196

22 Claims. (Cl. 97—137)

The present invention relates to vineyard cultivators and has for its principal object the provision of means for working the earth close to the vines.

In the care of vineyard lands one of the seasonal tasks is the cultivation of the earth in the rows between the vines and immediately surrounding the individual trunks. It has been the established practice to first plow or cultivate the widest permissible strip of earth between the rows of vines by means of a gang implement and, in a subsequent operation, utilize a horse drawn single plow, which the operator sideslips around the trunks, as a means of working the earth between the vines in the individual rows. This is extremely exhausting manual labor. Moreover, it is rather generally necessary to thereafter manually hoe the earth about the vine trunks in order to complete the work of removing weeds, grasses and the like.

We are aware that various devices have been devised for this particular use but it has been our observation that none of them has been found satisfactory or operative in any desirable or measurable degree, for which reasons substantially all, if not all, vineyardists rely upon the above-described crude and costly method of cultivation.

It is an object of this invention to provide an extremely simplified and inexpensive apparatus for the stated purpose which may be readily attached to a tractor or the like and which will completely and effectually work the earth adjacent the vines or trunks.

In general terms, the foregoing objects of this invention are accomplished through the provision of a mechanism adapted for attachment to a vehicle frame having a plow or other earthworking means movable laterally with respect to the direction of travel of the vehicle to work the desired areas.

For practical operation a device of the character described must be designed to meet, among others, the following requirements: There must be constant maintenance of the directional alignment of the plow when reciprocated laterally while progressing forwardly; regulation and control of the depth of the plow without interruption to operation; there must be sufficient clearance of parts associated with the earthworking element to avoid clogging thereof; there must be adequate means for affecting clearance of the vines by the earthworking element to avoid injury; there must be avoidance of undue and unnecessary strain at the point of pull by the earthworking element, and lastly, the device must obtain equal distribution of and require but a minimum of power to effect lateral reciprocal movement of the plow. Additionally, the apparatus must be speedy in operation. All of these desirable attributes are attained in the device forming the subject matter of this application. Construction and demonstration have indicated that the device has a high practical value and is extremely efficient for the purpose intended.

While the apparatus forming the subject matter hereof has been developed particularly for use in vineyard and like row cultivation, it will be readily perceivable that the machine has many uses in addition to those specified. For instance, the apparatus is quite readily adaptable for use in spot weeding, such as in the maintenance of highways and the contiguous right of way areas. For this reason it is to be understood that the references herein made to use of the device in vineyard cultivation are to be taken as illustrative only and not as terms of limitation.

These and other objects of the invention will become more apparent as this specification proceeds and the novelty hereof will be particularly pointed out in the appended claims.

In the drawings:

Fig. 1 is a top plan view of a cultivator employing the principles of this invention.

Fig. 2 is a side elevation of the pivotal support means for the earthworking implement, and showing, diagrammatically, means for effecting reciprocal movement of the implement.

Fig. 3 is an elevation of the subject matter of Fig. 2, and showing a plow in its connected position.

Fig. 4 is an enlarged sectional detail of the eccentric connection for the compensator bars.

Fig. 5 is an end view, on line 5—5 of Fig. 1, of the universal joint to which the forward end of the device is attached.

The numeral 10 designates generally the frame of a vehicle, such as a tractor or a wheeled, drawn vehicle to which the apparatus forming the subject matter hereof is removably attached. The earthworking tool, in this instance a plow 11, is disposed at the angled end 12 of a beam 13, the opposite end of which beam is connected for pivotal movement to the vehicle frame 10 through the medium of a knuckle joint 14, a yoke 15 therefor and bar 16, the latter being bolted or otherwise secured directly to the vehicle frame 10. It will thus be appreciated that the beam 13 is adapted for lateral and vertical movement in relation to the point of connection of its forward end.

The opposite end of the beam 13 is supported for lateral movement, with respect to the vehicle frame 10, in the earthworking operation, by means of a frame member 20 in the form of a right-angle triangle, the vertical leg of which is pivotally connected to the hereinafter described adjustment member secured to vehicle frame 10. The connection between the angled end 12 of beam 13 and the frame member 20 consists in a bracket 22 and grooved roller 23, the latter rolling on the base 24 of the triangular frame member 20. The frame member 20 is adjustable vertically with respect to vehicle frame 10 as will be hereinafter described. It will now be seen that the angled end 12 of beam 13, and the implement carried thereby are movable laterally with respect to the frame 10 in the normal earthworking operation, and that they may be adjusted vertically.

Proceeding now to a more detailed description of parts and their relative function, it will be noted in Fig. 1 that bar 16 is provided with a brace bar 25 and rod 26, each of which is suitably connected, as by bolting, to the vehicle frame 10 (not shown). Yoke 15 is bolted to bar 16 and is disposed at an outward angle thereto. A knuckle 14 is hingedly connected to yoke 15 by engagement of the arms thereof being retained by cap screws 28. Knuckle 14, it will be appreciated, is free to pivot vertically but held by yoke 15 against lateral oscillation.

A yoke 29, bolted to the end of beam 13, as at 30, has top and bottom bearing members 31 in vertical alignment for connection to knuckle 14 by means of a bolt 33 extending through a vertical bore in the joint 14, said bolt being retained by nuts 34.

As a means of maintaining constant forward directional alignment of the plow 11 during lateral projection and retraction, with respect to frame 10 and thus avoiding the stresses and strains which would result from a rigid connection of the plow to its supporting member, we have provided the mechanism shown to the best advantage in Figures 1 and 3. A pair of compensator rods 40 are connected at their forward ends to the arms 41 integral with knuckle 14 and attached at their opposite ends to the arms 42 of the pivotal mount 43 for the earthworking implement.

In order to provide for adjustment of the earthworking tool with respect to its position of maximum efficiency in its forward motion, we have provided the mechanism shown in Figure 5 for connecting the compensator rods 40 to arms 41. The ends of the rods 40 are apertured to receive an eccentric bushing 44 through which a stud bolt 45 is thrust for threaded engagement with a boss 46 formed at the end of arm 41. Thus to change the pitch of the plow 11 the stud bolts 45 are first loosened, after which by manipulation of the bushings 44 by grasping the knurled edge of the flange thereof, the pitch is adjusted as desired and the stud bolts 45 are tightened to hold the bushing 44 against rotation.

The connection of the compensator rods 40 to mount 42 (Figures 1 and 3) consists of a pair of bosses 47, at the ends of arm 45, into which the stud bolts 49 are turned.

The mount 42 for the earthworking implement and associated elements are shown to best advantage in Figures 1 and 3. The angled end 12 of the beam 13 is provided with a downwardly projecting boss 51 having a recess therein to receive a stud 52 retained therein and against rotation by a pin 53 extending through the boss 51. The mount 42 has an axially disposed apertured boss 54 through which stud 52 projects and is retained by a suitable nut 55. Thus the mount 42 is free to oscillate on the end of beam 13 under the urge of the compensator rods 40.

A fork 60 is formed as an integral part of and projects rearwardly from the mount 42 to support the plow 11. The shank 61 of plow 11 is connected adjacent its upper end to the fork by a bolt 62 extending through the dependent members 63 thereon. A two-position adjustment of the vertical pitch of the plow is accomplished by the provision of the aperture projections 64 on fork 60, directly above the dependent members 63, through which a conventional pin is thrust for engagement with the upper end of the plow shank 61.

As a means of avoiding injury to the vine trunks as the device hereof travels through the vineyard, there is provided a forwardly extending guard 65 in the form of a rod having a toe 66 bent inwardly at its free end beneath outermost compensator rod 40. The opposite end of the guard is bent inwardly at right angles and is connected to a forwardly projecting fork 67 integral with plow mount 42 by means of conventional nuts.

It will be appreciated from the foregoing description and Fig. 1 of the drawings that should the operator fail to retract the mechanism in time, guard 65 will be drawn against the vine trunk in advance of the plow 11 and urge the plow and the elements associated therewith away from the same before harm is done.

The triangular support member 20 is supported by a frame 70 secured to the tractor 10 in any conventional manner such as by bolting (not shown). The vertical leg 71 of the triangular member has a longitudinal bore to slidably receive a rod 72 secured in the frame 70 by threaded engagement with top and bottom nuts 73. Vertical adjustment of the support member 20, and hence the raising of and lowering of the plow 11, is accomplished by the provision of a jack-screw 74 engaging a block 75 rigidly fixed on leg 71 of the member 20. A handwheel 76 for the jack-screw 74 is located for convenient operation at the top of the frame 70. The turning of the handwheel 76, it will be seen, causes the block 75 to be raised or lowered on the jack-screw 74, and the vertical leg 71 of the triangular member 20 to slide on rod 72 in making the desired vertical adjustment of the supported plow 11.

The novel support for the tool end of the arm 13 and the adjustment means therefor accomplish a two-fold purpose. In the first place it eliminates the necessity for the conventional castor wheel with which most devices of this character are equipped and thus avoids the interruptions occasioned by the clogging of the wheels by debris and the like. Secondly, the depth of the furrow cut by plow 11 can be adjusted while the device is in motion and without the operator leaving his post.

A simplified means of projecting and retracting the earthworking element is shown in the form of a lever 80 fulcrumed on the tractor 10, operatively connected to the angled end 12 of beam 13 by means of a rod 81 and a swivel bracket, the latter fixedly secured on the end 12 of beam 13.

While the device is thus shown as manually operable, it will be appreciated that it is well within the spirit of this invention to utilize various known power mechanisms to effect lateral movement of the earthworking tool. Hence, the specific means shown and described is to be regarded as illustrative only.

Operation

From the foregoing description it will be understood the operation of the device is as follows: The operator, having first taken into consideration soil conditions, the foreign growth to be removed and like factors, adjusts the vertical pitch of the plow 11 or other earthworking implement by removing the pin connecting the upper end of plow shank 61 and members 64 on fork 60 and resets the same when the plow has been moved into its selected position.

The horizontal pitch of plow 11 is next adjusted by loosening the stud bolts 45 at the forward ends of the compensator rods 40 and repositioning the eccentric bushings 44 which, through the medium of the rods 40, will cause the plow mount 42 to be swung on its pivot to effect the desired adjustment of plow 11. The bolts 45 are then re-tightened As the vehicle 10 commences its travel through the area to be cultivated the operator determines the desired depth of the furrow to be cut and by manipulation of handwheel 76 raises or lowers the plow according to the conditions to be met.

The earthworking tool, here the plow 11, is moved about, while cutting a furrow and without removal from the earth, by movement of the lever 80 from right to left, (looking at Figs. 1 and 2). As the lever is swung to the right the end of beam 13 is caused to be moved outwardly by rod 81, and plow 11 is knifed through the soil. In this movement the roller 23, supporting beam 13, is caused to move over the base portion 24 of triangular support member 20 and the latter swings outwardly (from the position shown in dotted lines in Figure 2) on its pivot consisting of rod 72 in the frame 21. This outward movement of the mechanism is limited by the length of the base member 24 of the support 20. As the plow is thus laterally moved its horizontal pitch is maintained in direct forward alignment, with respect to vehicle 10, by the compensator rods 40 which cause plow mount 42 to be turned on its pivotal point. It will be understood that this automatic adjustment of the pitch of the plow eliminates the side stresses and strains incidental to lateral knifing of a tool through the soil, which has proved so vexatious a problem in the past both in mechanical devices and so exhausting in the case of the horse drawn plow manually moved in and about the vines.

It will be fully appreciated from the foregoing that only a preferred form of this invention has been herein illustrated and described, and that the principles hereof may take many forms without departing from the spirit of the invention. Accordingly, we desire protection according to the full scope of the appended claims.

The invention claimed is:

1. In a cultivator of the class described, a beam supported at one end for lateral pivotal movement on a horizontal plane, an earthworking tool carried by the opposite end of the beam, pivotal support means for the tool end of the beam, and means for causing reciprocal lateral movement of the tool end of the beam.

2. In a cultivator of the class described, a beam supported at one end for lateral pivotal movement on a horizontal plane, an earthworking tool carried by the opposite end of the beam, pivotal support means for the tool end of the beam, means for raising or lowering the tool end of the beam, and means for causing reciprocal lateral movement of the tool end of the beam.

3. In a cultivator of the class described, a beam supported at one end for lateral pivotal movement on a horizontal plane, an earthworking tool carried by the opposite end of the beam, pivotal support means for the tool end of the beam, means for raising or lowering the pivotal support means for the tool end of the beam, and means for causing reciprocal lateral movement of the tool end of the beam.

4. In a cultivator adapted for attachment to a vehicle frame, the combination of a beam attached at one end to the vehicle for lateral pivotal movement on a horizontal plane, a pivotal support on the vehicle frame for the opposite end of said beam, an earthworking tool carried by the last mentioned end of said beam, and means for causing reciprocal lateral movement of the end of said beam upon which said tool is carried.

5. In a cultivator adapted for attachment to a vehicle frame, the combination of a beam attached at one end to the vehicle for lateral pivotal movement on a horizontal plane, a pivotal support on the vehicle frame for the opposite end of said beam, means for raising or lowering said pivotal support, an earthworking tool carried by the last mentioned end of the beam, and means for causing reciprocal lateral movement of the tool end of said beam.

6. In a cultivator adapted for attachment to a vehicle, the combination of a beam attached at its forward end to the vehicle for lateral pivotal movement on a horizontal plane, a pivotal support on the vehicle for the rear end of said beam, an earthworking tool carried at the rear end of said beam, and means independent of said pivotal support for causing reciprocal lateral movement of the rear end of said beam.

7. In a cultivator adapted for attachment to a vehicle, the combination of a beam attached at its forward end to the vehicle for lateral pivotal movement on a horizontal plane, a support on the vehicle for the rear end of said beam, an earthworking tool carried by the rear end of said beam, means independent of said support for causing reciprocal lateral movement of the rear end of said beam, said support for the rear end of said beam being adapted to follow the arc prescribed by the free end of said beam in its reciprocal lateral movement.

8. A cultivator adapted for attachment to a vehicle comprising a beam attached at its forward end to the vehicle for lateral pivotal movement, a triangular support member pivotally attached to the vehicle, a roller on the base of the triangular support, a connecting member for said roller and the rear end of said beam, an earthworking tool carried by the rear end of said beam, and means on said vehicle to cause the rear end of said beam to reciprocate laterally.

9. A cultivator adapted for attachment to a vehicle comprising a beam attached at its forward end to the vehicle for lateral pivotal movement, a triangular support member pivotally attached to the vehicle, a roller on the base of the triangular support, a connecting member for said roller and the rear end of said beam, a jack-screw on the vehicle for said triangular support member, an earthworking tool carried by the rear end of said beam, and means on said vehicle to cause the rear end of said beam to reciprocate laterally.

10. A cultivator adapted for attachment to a vehicle comprising a beam attached at its forward end to the vehicle for lateral pivotal movement, a support member for the opposite end of the beam in the form of a right-angle triangle the vertical leg of which is pivotally connected to the vehicle, a roller on the base of the triangular support member, a swivel connector for said roller and the rear end of said beam, an earthworking tool carried by the rear end of said beam, and means for causing reciprocal lateral movement of the tool end of said beam.

11. A cultivator adapted for attachment to a vehicle comprising a beam attached at its forward end to the vehicle for lateral pivotal movement, a support member for the opposite end of the beam in the form of a right-angle triangle the vertical leg of which is pivotally connected to the vehicle, a roller on the base of the triangular support member, a swivel connector for said roller and the rear end of said beam, means for raising or lowering said triangular support member with respect to said vehicle, an earthworking tool carried by the rear end of said beam, and means for causing reciprocal lateral movement of the tool end of said beam.

12. In a cultivator adapted for attachment to a vehicle, a beam connected at its forward end to said vehicle for lateral pivotal movement, a pivotal support for the opposite end of said beam, means for causing lateral reciprocal movement of the rear end of said beam, an earthworking tool pivotally connected to the rear end of said beam, and means for maintaining constant directional alignment of the earthworking tool irrespective of the angle of the beam in relation to the vehicle.

13. In a cultivator adapted for attachment to a vehicle, a beam connected at its forward end to said vehicle for lateral pivotal movement, a pivotal support for the opposite end of said beam, a mount for an earthworking tool pivotally disposed at the rear end of said beam, a tool connected to said mount, and means for maintaining constant directional alignment of said tool irrespective of the angle of the beam in relation to the vehicle.

14. In a cultivator adapted for attachment to a vehicle, a support member fixed on said vehicle, a beam connected at its forward end to said support for lateral reciprocal movement, means for causing lateral reciprocal movement of the rear end of said beam, a mount for an earthworking tool pivotally disposed at the rear end of said beam, a tool on said mount, a pair of compensator members pivotally connected at their forward ends to said support on the vehicle and to said tool mount at their opposite ends.

15. In a cultivator adapted for attachment to a vehicle, a support member fixed on said vehicle, a beam connected at its forward end to said support for lateral pivotal movement, means for causing lateral reciprocal movement of the rear end of said beam, a mount for an earthworking tool pivotally disposed at the rear end of said beam, a tool on said mount, a pair of compensator rods pivotally connected at their forward ends to said support on the vehicle independently of the connection of said beam thereto, said rods being pivotally connected to said tool mount at their opposite ends.

16. In a cultivator adapted for attachment to a vehicle, a yoke fixed on said vehicle, a knuckle joint engaged thereby, a beam connected to said knuckle joint for lateral pivotal movement, means for causing lateral reciprocal movement of the rear end of said beam, a pivotal mount for an earthworking tool disposed at the rear end of said beam, a tool on said mount, a pair of diametrically opposed projections on said tool mount, and a pair of parallel compensator rods pivotally connected at their forward ends to opposite ends of said knuckle joint and at their opposite ends to the respective projections on said tool mount.

17. In a cultivator, the combination of a vehicle, a beam connected at its forward end to said vehicle for universal pivotal movement, a pivotal support on said vehicle for the opposite end of said arm, a pivotal mount for an earthworking tool disposed at the rear end of said arm, a tool on said mount, means for causing lateral reciprocal movement of the tool end of said beam, and means for maintaining constant directional alignment of said tool irrespective of the angle of the beam in relation to said vehicle.

18. In a cultivator, the combination of a vehicle, a beam connected at its forward end to said vehicle for universal pivotal movement, a pivotal support on said vehicle for the opposite end of said beam, means for vertically adjusting said pivotal support with respect to the vehicle frame, a pivotal mount for an earthworking tool disposed at the rear end of said beam, a tool on said mount, means for causing lateral reciprocal movement of the tool end of said beam, and means for maintaining constant directional alignment of said tool irrespective of the angle of the beam in relation to said vehicle.

19. In a cultivator, the combination of a vehicle, a yoke fixed on said vehicle, a knuckle joint engaged thereby, a beam connected to said knuckle joint for lateral pivotal movement, a pivotal support on the vehicle for the rear end of said beam, means for vertically adjusting said pivotal support with respect to the vehicle, a pivotal mount for an earthworking tool disposed at the rear end of said beam, a pair of parallel rods pivotally connected at their forward ends to opposite ends of said knuckle joint and at their opposite ends to said tool mount, and means on said vehicle having an operative connection to the rear end of said beam to cause lateral reciprocal movement thereof.

20. In a cultivator, the combination of a vehicle, a yoke fixed on said vehicle, a knuckle joint engaged thereby, a beam connected to said knuckle joint for lateral pivotal movement, a support for the rear end of said beam in the form of a right-angle triangle the vertical leg of which is pivotally connected to said vehicle, a roller on the base of said triangular support, a swivel connector for said roller and the rear end of said beam, a pivotal mount for an earthworking tool disposed at the rear end of said beam, a pair of parallel rods pivotally connected at their forward ends to opposite ends of said knuckle joint and at their opposite ends to said tool mount, and means on said vehicle having an operative connection to the rear end of said beam to cause lateral reciprocal movement thereof.

21. In a cultivator, the combination of a vehicle, a yoke fixed on said vehicle, a knuckle joint engaged thereby, a beam connected to said knuckle joint for lateral pivotal movement, a support for the rear end of said beam in the form of a right-angle triangle the vertical leg of which is pivotally connected to said vehicle, a roller on the base of said triangular support, a connector for said roller and the rear end of said beam, means for vertically adjusting said triangular support member with respect to said vehicle, a pivotal mount for an earthworking tool disposed at the rear end of said beam, a pair of parallel rods pivotally connected at their forward ends to opposite ends of said knuckle joint, and at their opposite ends to said tool mount, and means on said vehicle having an operative connection to the rear end of said beam to cause lateral reciprocal movement thereof.

22. In a cultivator, the combination of a vehicle, a yoke fixed on said vehicle, a knuckle joint engaged thereby, a beam connected to said knuckle joint for lateral pivotal movement, a support for the rear end of said beam in the form of a right-angle triangle the vertical leg of which is pivotally connected to said vehicle, a roller on the base of said triangular support, a connector for said roller and the rear end of said beam, means for vertically adjusting said triangular support member with respect to said vehicle, a pivotal mount for an earthworking tool disposed at the rear end of said beam, a pair of parallel rods pivotally connected at their forward ends to opposite ends of said knuckle joint, and at their opposite ends to said tool mount, a forwardly extending guard member fixed on said tool mount having its free end bent inwardly, and means on said vehicle having an operative connection to the rear end of said beam to cause lateral reciprocal movement thereof.

HENRY A. JACOBS.
HUBERT M. ARMISTEAD.